(12) United States Patent
Schneider et al.

(10) Patent No.: US 7,770,922 B2
(45) Date of Patent: Aug. 10, 2010

(54) CUSHION AND HOUSING VENTS FOR INFLATABLE CUSHION AIRBAGS

(75) Inventors: David W. Schneider, Waterford, MI (US); ChangSoo Choi, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/204,626

(22) Filed: Sep. 4, 2008

(65) Prior Publication Data

US 2010/0052298 A1    Mar. 4, 2010

(51) Int. Cl.
    B60R 21/30    (2006.01)
(52) U.S. Cl. ..................................... 280/739
(58) Field of Classification Search ................. 280/739, 280/740, 743.1, 736
    See application file for complete search history.

(56) References Cited

U.S. PATENT DOCUMENTS

| | | | |
|---|---|---|---|
| 4,126,325 A | | 11/1978 | Weman |
| 5,246,250 A | | 9/1993 | Wolanin et al. |
| 5,366,242 A | * | 11/1994 | Faigle et al. ............... 280/736 |
| 5,405,166 A | | 4/1995 | Rogerson |
| 6,126,191 A | * | 10/2000 | Pepperine et al. ......... 280/728.2 |
| 6,139,048 A | | 10/2000 | Braunschadel |
| 6,550,807 B1 | | 4/2003 | Faigle et al. |
| 6,648,371 B2 | | 11/2003 | Vendely et al. |
| 6,746,045 B2 | * | 6/2004 | Short et al. ................. 280/736 |
| 6,959,945 B2 | | 11/2005 | Fischer et al. |
| 6,991,258 B2 | | 1/2006 | Hawthorn et al. |
| 7,017,945 B2 | | 3/2006 | DePottey et al. |
| 7,036,843 B2 | * | 5/2006 | Okamoto et al. ......... 280/728.3 |
| 7,261,319 B2 | | 8/2007 | DePottey et al. |
| 7,318,602 B2 | | 1/2008 | DePottey et al. |
| 7,328,915 B2 | | 2/2008 | Smith et al. |
| 7,347,450 B2 | | 3/2008 | Williams, et al. |
| 7,413,218 B2 | | 8/2008 | Ekdahl |
| 2002/0121770 A1 | * | 9/2002 | Schneider .................. 280/732 |
| 2003/0209895 A1 | | 11/2003 | Gu |
| 2005/0098991 A1 | | 5/2005 | Nagai et al. |
| 2006/0208472 A1 | | 9/2006 | De Pottey et al. |
| 2008/0073893 A1 | * | 3/2008 | Schneider .................. 280/740 |
| 2008/0252052 A1 | | 10/2008 | Schneider et al. |
| 2008/0252053 A1 | * | 10/2008 | Schneider et al. ........... 280/742 |

OTHER PUBLICATIONS

Notification of Transmittal of the International Search Report and the Written Opinion of the International Searching Authority issued Aug. 1, 2008 in International Application No. PCT/US2008/052254.

(Continued)

*Primary Examiner*—Faye M. Fleming
(74) *Attorney, Agent, or Firm*—Sally J Brown; Stoel Rives, LLP

(57) ABSTRACT

An airbag assembly comprising a housing with an inflatable airbag cushion disposed therein and at least one vent aperture attached to the inflatable airbag cushion, wherein during inflatable airbag cushion deployment with an obstruction, the at least one vent aperture remains open, and during inflatable airbag cushion deployment without an obstruction, the at least one vent aperture at least partially closes.

27 Claims, 6 Drawing Sheets

OTHER PUBLICATIONS

Restriction Requirement issued Mar. 9, 2009 in co-pending U.S. Appl. No. 12/133,267.
Response to Requirement for Election of Species filed Apr. 9, 2009 in co-pending U.S. Appl. No. 12/133,267.
Office Action issued May 15, 2009 in co-pending U.S. Appl. No. 12/133,267.
Amendment and Response to Office Action filed Nov. 16, 2009 in co-pending U.S. Appl. No. 12/133,267.
Notice of Allowance and Fee(s) Due issued Feb. 9, 2010 in co-pending U.S. Appl. No. 12/133,267.
Request for Continued Examination filed Mar. 2, 2010 in co-pending U.S. Appl. No. 12/133,267.
Restriction Requirement issued Mar. 9, 2009 in co-pending U.S. Appl. No. 11/786,559.
Response to Requirement for Election of Species filed Apr. 9, 2009 in co-pending U.S. Appl. No. 11/786,559.
Office Action issued May 15, 2009 in co-pending U.S. Appl. No. 11/786,559.
Amendment and Response to Office Action and Terminal Disclaimer filed Nov. 16, 2009 in co-pending U.S. Appl. No. 11/786,559.
Approval of Terminal Disclaimer issued Nov. 16, 2009 in co-pending U.S. Appl. No. 11/786,559.
Notice of Allowance and Fee(s) Due issued Feb. 8, 2010 in co-pending U.S. Appl. No. 11/786,559.
Request for Continued Examination filed Mar. 4, 2010 in co-pending U.S. Appl. No. 11/786,559.

* cited by examiner

CUSHION AND HOUSING VENTS FOR INFLATABLE CUSHION AIRBAGS

TECHNICAL FIELD

The present disclosure relates generally to the field of automotive protective systems. More specifically, the present disclosure relates to inflatable cushion airbags.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

Figure 1A:
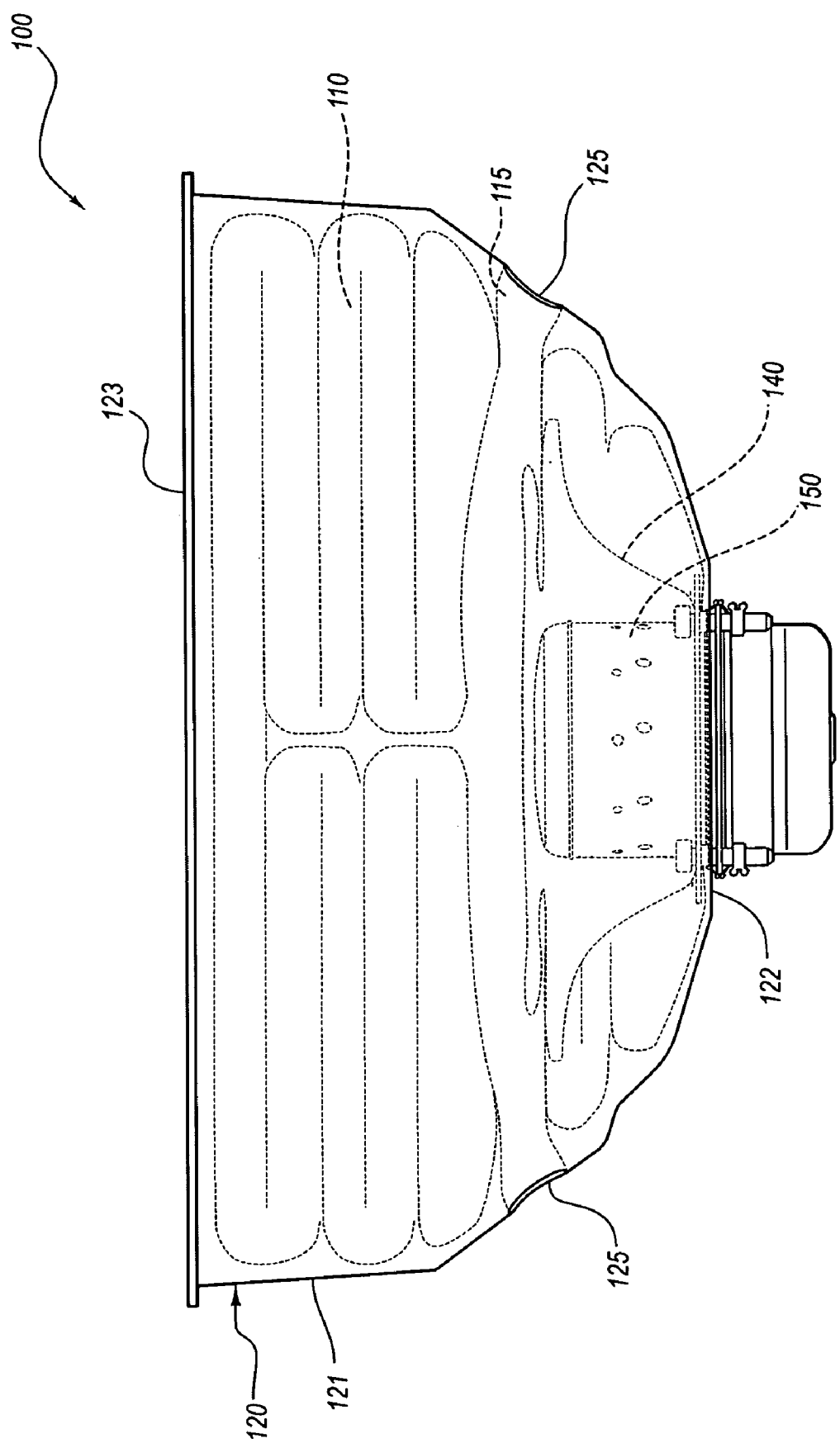
FIG. 1A is a front elevation view of an airbag assembly, wherein the assembly is in a packaged configuration.

INDEX OF ELEMENTS IDENTIFIED IN THE DRAWINGS 100 inflatable cushion air bag assembly
110 cushion membrane
115 vent aperture
120 housing
121 side wall
122 bottom portion
123 cover
125 aperture
140 diffuser
150 inflator
200 inflatable cushion air bag assembly
210 cushion membrane
215 vent aperture
216 tab
217 slot
218 tear stitching
220 housing
221 side wall
223 cover
225 aperture
226 attachment structure
240 diffuser
250 inflator
300 airbag assembly
310 cushion membrane
315 vent aperture
316 tab
317 slot
318 tear stitching
326 housing extension
400 airbag assembly
410 cushion membrane
415 vent aperture
416 tab
417 slot
418 tear stitching
426 housing extension
500 airbag assembly
510 cushion membrane
515 vent aperture
516 tab
517 slot
518 tear stitching
526 housing extension

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag assemblies have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes configurations from the rolled/folded configuration to an expanded configuration.

Figure 1B:
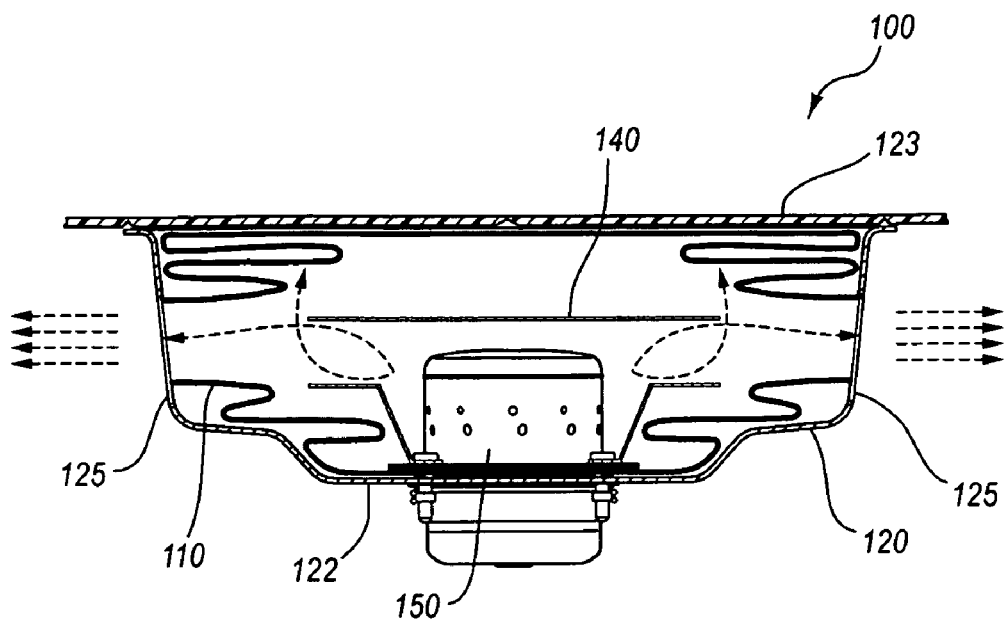
FIG. 1B is a cross sectional view of the airbag assembly of FIG. 1A, wherein the assembly is in an early stage of deployment.
Figure 1C:
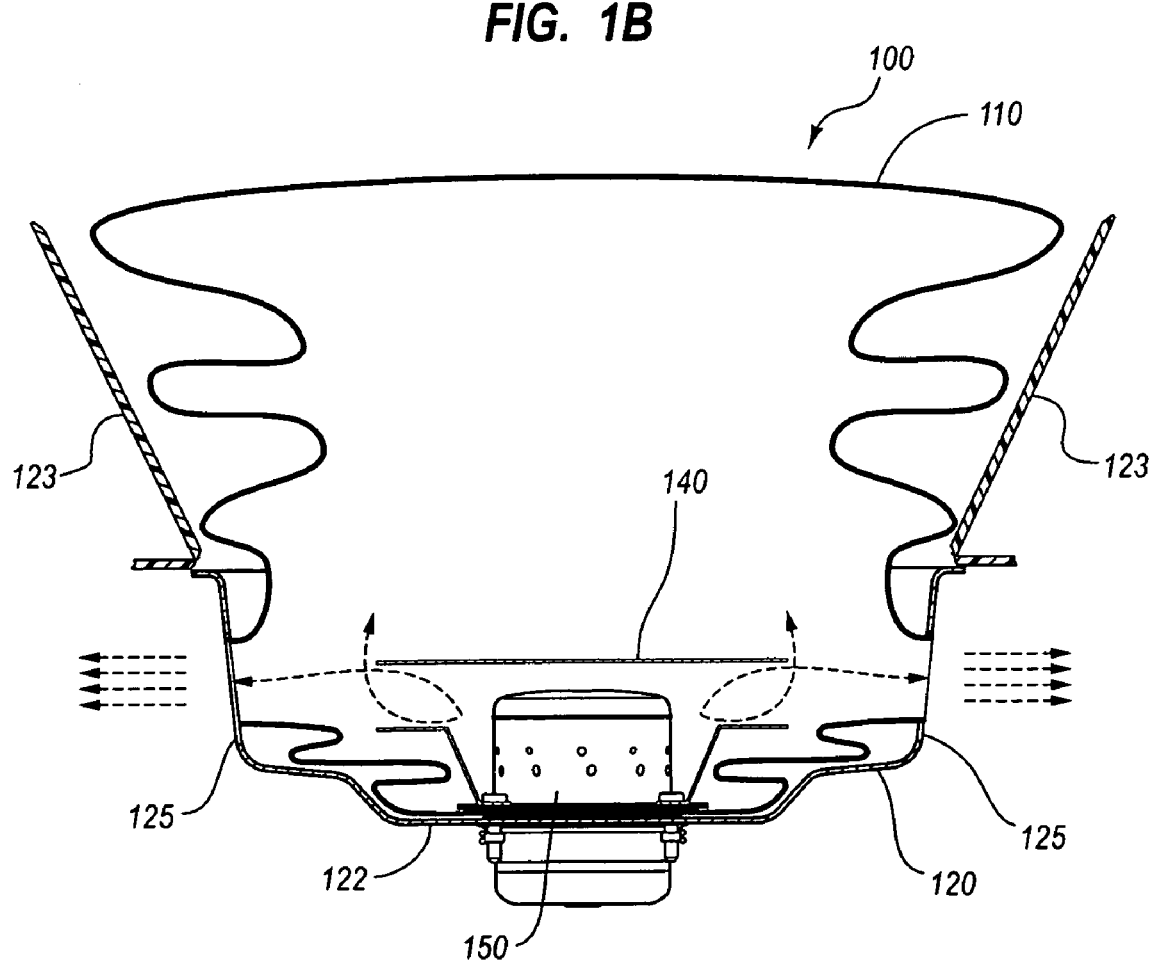
FIG. 1C is a cross sectional view of the airbag assembly of FIG. 1A, wherein the assembly is in a later stage of deployment.
Figure 1D:
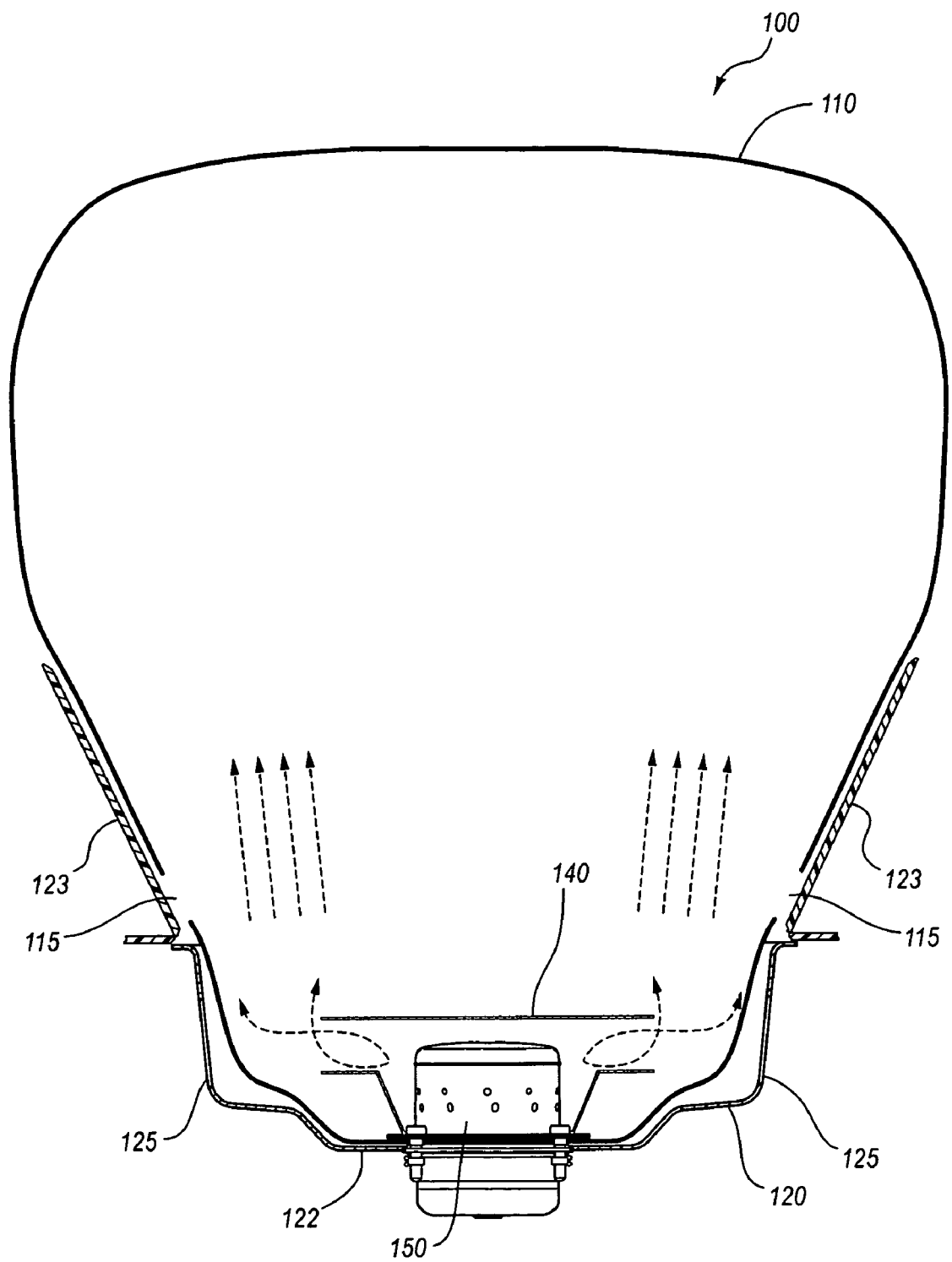
FIG. 1D is a cross sectional view of the airbag assembly of FIG. 1A, wherein the assembly is maximally deployed.

FIGS. 1A-1D depict airbag assembly 100, from various views, wherein FIG. 1A is a front elevation view and FIGS. 1B-1D are cross sectional views. Airbag assembly 100 may comprise an inflatable cushion membrane 110, a housing 120, a diffuser 140, and an inflator 150. In an undeployed state, assembly 100 may be configured to be packaged and mounted within an instrument panel or steering wheel located at the front of a vehicle.

As depicted in FIG. 1A, cushion membrane 110 is in a folded and/or rolled configuration, which may be called a packaged configuration. Membrane 110 comprises at least one aperture 115 that may be called a vent, and the membrane is configured to be coupled to a bottom portion 122 of the housing such that inflator 150 may produce inflation gas to fill an inflatable void of the membrane. Vent aperture 115 may not comprise a tubular extension of cushion 110.

In the packaged configuration, vent aperture 115 may be at least partially aligned with aperture 125 in housing 120. Aperture 125 may be located on a side wall 121 of housing 120, or alternatively the aperture may be located on the bottom portion 122. In another embodiment, vent aperture 115 is not retained in alignment with housing aperture 125 through the use of a particular structure or device; however, in other embodiments, the vent aperture may be retained in alignment with the housing aperture via a clip, tape, hooks and loops closures, or any other suitable material or technique.

In the packaged configuration, housing 120 may have a cover 123, or in alternative embodiments, the housing may also comprise a soft pack and/or deployment flap. For illustrative purposes, multiple vent apertures 115 are shown in FIGS. 1A-1D, however one or more vent apertures may be used to vent the inflation gas from the airbag cushion 110. In the depicted embodiment, two vent apertures 115 are symmetrically located adjacent housing apertures 125. In the undeployed state, the airbag cushion 110 may be rolled and/or folded within the assembly housing 120 and may include areas of slack both above and below the vent apertures 115, as shown by FIG. 1A.

Diffuser 140 may comprise a fabric or rigid material that is configured to direct the inflation gas toward vent 115 and aperture 125 during airbag inflation. More particularly, a loop diffuser may be sewn inside airbag cushion 110, or alternatively, the assembly housing 120 can include a housing diffuser. The diffuser may be rectangular, trapezoidal, hexagonal, round, etc. It may also have a portion which is round or elliptical while other portions are angled. If a vehicle occupant is in a normal position and airbag inflation is unrestricted, diffuser 140 functions to direct at least a portion of the inflation gas generally toward apertures 115 and 125. However, because diffuser 140 and vent apertures 115 are independent of each other, the airbag cushion side panels can expand and move during inflation such that the inflation gas flow becomes misaligned with the vent apertures 115. In this way, the vents 115 may be closed or the ability of the vent to vent inflation gas may be at least partially reduced, thereby retaining inflation gas within cushion 110 for normal occupant restraint.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable curtain cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

One skilled in the art will also appreciate that the retention of inflation gas within the cushion can be modulated by the presence of one or more fixed or discrete vents, which are configured to allow for inflation gas to exit the interior of the cushion. Further, in order for a fully inflated shape of an airbag cushion membrane to adopt a predetermined shape, internal and external tethers may be used, wherein the tethers limit the expansion of the airbag and restrict it to a specific shape. Tethers are typically coupled to one or more surfaces of a cushion membrane and extend to another surface of the cushion, the airbag housing, or a vehicle structure.

The vent may comprise a dynamic vent which may change configuration during the course of airbag deployment or remain in or adopt an open configuration if an obstruction such as an out-of-position occupant is encountered during airbag deployment. For example, the dynamic vent may be configured to change from an open state during initial airbag deployment to an at least partially closed state later in airbag deployment. Alternatively, the vent may deploy in a closed configuration and adopt an open state during the course of airbag deployment, and then become closed again at a later stage of airbag deployment, unless an obstruction is encountered in which case the vent may remain open. Examples of closeable vents that may be used are disclosed in U.S. Pat. No. 7,347,450 and U.S. patent application Ser. No. 11/589,316 filed on Oct. 27, 2006, and published as U.S. Patent Publication No. 2007/0216146, which is hereby incorporated by reference.

The inflator is configured to be activated in response to predetermined vehicle conditions as determined by vehicle sensors. Upon activation, the inflator rapidly generates or releases inflation gas, which forces the airbag cushion through the cosmetic cover and rapidly inflates the cushion. The inflator may be one of several types, such as pyrotechnic, stored gas, or a combination inflator. Additionally, the inflator may comprise a single or multistage inflator.

As will be appreciated by those skilled in the art, a variety of types and configurations of airbag housings can be utilized without departing from the scope and spirit of the present disclosure. For example, in one embodiment, the housing comprises fabric that may or may not further comprise a mounting structure. Also, the housing may have an integrated inflator, or the housing may be used to mount the inflator with the vehicle. Alternatively, the housing may not connect to the inflator and a path of inflation gas travel may not flow through the housing. Additionally, in the packaged state, a deployment flap may be disposed between the inflatable cushion membrane and a top portion of the housing, which may comprise a cosmetic cover. During airbag deployment, the deployment flap may function to protect the cushion membrane from damage caused by the housing, cosmetic cover edges, or other structures disposed near the housing and in the path of the deploying cushion membrane.

FIGS. 1B-1D provide cross sectional views of airbag assembly 100 which illustrate a deployment sequence of airbag cushion 110 deploying from a assembly housing 120. As shown by FIG. 1B, as the inflation gasses are generated or released by inflator 150, diffuser 140 directs at least a portion of the gas toward vent apertures 115 and housing apertures 125. As inflation gasses begin to fill the airbag cushion 110, the folds above the vent apertures 115 may begin to expand allowing the airbag cushion 110 to deploy beyond the assembly housing 120. Upon initial deployment of the airbag cushion 110, the inflation gasses, represented by the arrows, are generated by inflator 150 and may flow out of diffuser 140; a portion of the inflation gasses may flow into airbag cushion 110 and a portion of the inflation gasses may flow out of vent apertures 115. At this time, vent apertures 115 are still in alignment with housing apertures 125 such that the inflation gasses may exit cushion 110 via vent apertures 115. If airbag cushion 110 does not encounter any obstruction during deployment, it may fully inflate as illustrated by FIG. 1D.

With continued reference to FIG. 1C and 1D, as the airbag cushion 110 nears full inflation, the folds in the fabric both above and below the vent apertures 115 may have been removed and the tension of the inflating airbag cushion 110 may place the vent apertures 115 out of alignment with the housing apertures 125. If cushion membrane 110 encounters an obstacle such as an out-of-position occupant, the progress of the membrane may be retarded such that diffuser 140 and apertures 115 and 125 remain at least partially aligned such that inflation gas continues to be substantially vented from inside the inflatable cushion membrane. If cushion membrane 110 does not meet an obstruction, the misalignment of vent apertures 115 with diffuser 140 and/or apertures 125 may allow the inflation gasses to fully inflate the airbag cushion 110 and provide the optimal protection for a properly positioned occupant.

Figure 2:
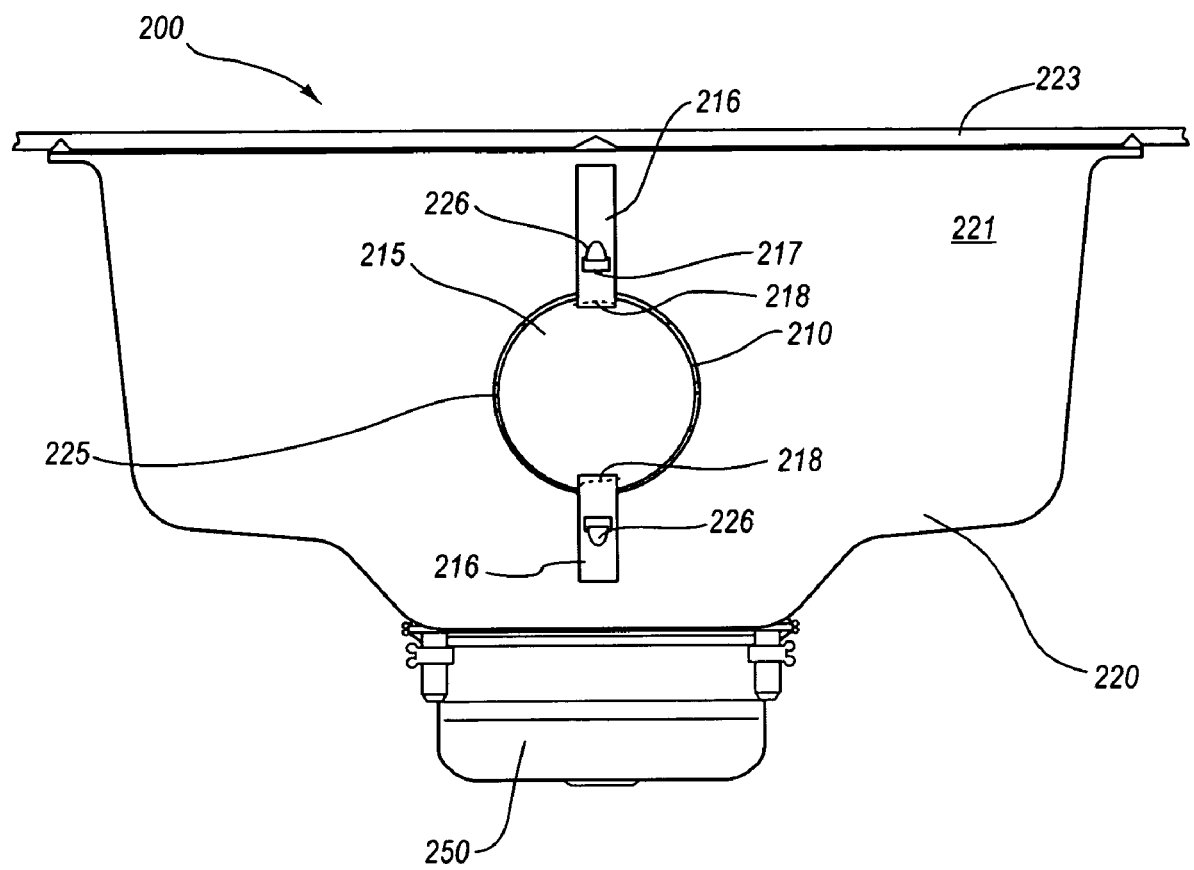
FIG. 2 is a side elevation view of an alternative embodiment of an airbag assembly.
Figure 3A:
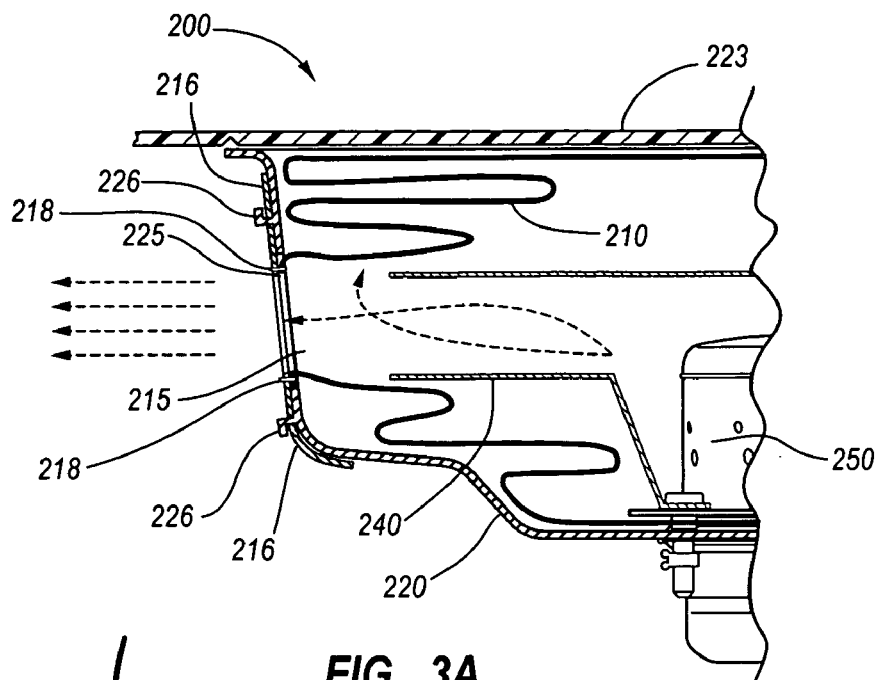
FIG. 3A is a cutaway cross sectional view of the airbag assembly of FIG. 2, wherein the airbag assembly is in an early stage of deployment.
Figure 3B:
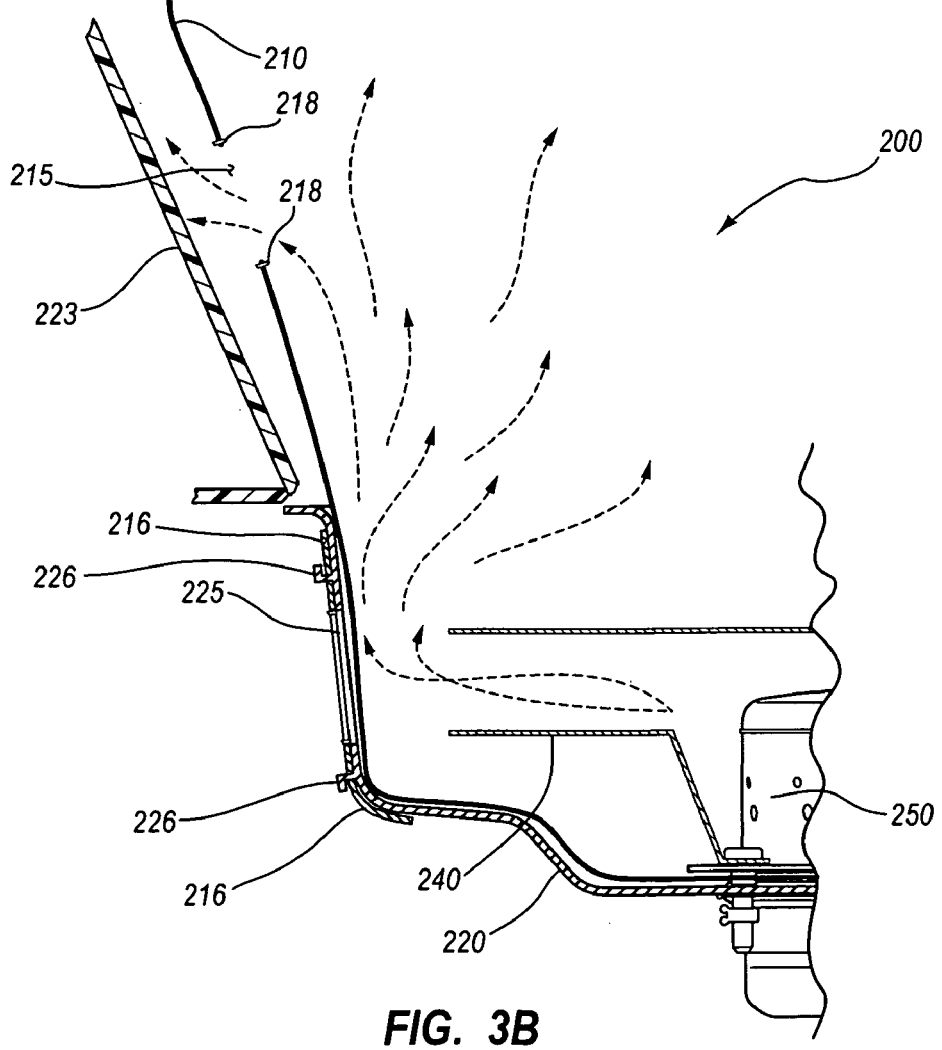
FIG. 3B is a cutaway cross sectional view of the airbag assembly of FIG. 2, wherein the airbag assembly is at a later stage of deployment.

FIGS. 2-3B depict an alternative embodiment of an airbag assembly 200, wherein FIG. 2 is a side elevation view and FIGS. 3A-3B are cross sectional cutaway views. Assembly 200 may be configured similarly to and may function similarly as airbag assembly 100, described herein, and may comprise a cushion membrane 210, a housing 220, a cover 223, a diffuser 240, and an inflator 250. As depicted in FIG. 2, cushion membrane 210 may comprise a vent aperture 215 that may be at least partially aligned with a housing aperture 225 when the cushion is in a packaged configuration. Prior to deployment, vent aperture 215 may be retained in a configuration wherein the vent is aligned with aperture 225 by employing complementary attachment structures on the cushion membrane near vent aperture 215 and on housing 220. For example, cushion membrane 210 may be releasably coupled to a tab 216 via tear stitching 218. The tab may have a slot 217 that is configured to be received by an extension 226 that projects from an outside portion of sidewall 221 of housing 220. In this way, tab 216 is retained on extension 226 and prior to airbag deployment, vent 215 is retained in alignment with aperture 225.

The tab may comprise the same material as the cushion membrane, or any other suitable material. The housing extension may be a contiguous, integral extension of the housing, or may be a feature that is coupled to the housing. As will be recognized by those skilled in the art, a variety of types and configurations of materials, mechanisms, and techniques may be employed to couple the tab to the housing. For example, clips, hooks and loops closures, snaps, and/or tape may be employed to couple the tab to the housing.

FIGS. 3A-3B depict cushion assembly 200 during a deployment sequence, wherein FIG. 3A is early in the sequence and FIG. 3B is later in the sequence. As depicted in FIG. 3A, the perimeter of vent aperture 215 of cushion membrane 210 is coupled to tab 216 via tear stitching 218. Tab 216 comprises a slot that has been received by extension 226 of housing 220 such that vent 215 is retained in an alignment with aperture 225. Upon inflator 250 activation, inflation gas (depicted as arrows) may be substantially directed towards apertures 215 and 225 via diffuser 240. Later in a deployment sequence, cushion 210 bursts through cover 223 and extends into a vehicle cabin. If cushion 210 contacts an obstacle such as an out-of-position occupant, tear stitching 218 may not rupture, in which case the cushion is at least temporarily maintained in an aperture-aligned configuration.

If cushion 210 does not contact an obstacle, it may continue to expand, as depicted in FIG. 3B such that tear stitching 218 ruptures thereby allowing vent aperture 215 and housing aperture 225 to become misaligned. Additionally, vent 215 may become misaligned with diffuser 240. In this way, inflation gas may be substantially retained in membrane 210 to provide cushioning for a vehicle occupant. After cushion 210 is torn free from tab 216, the tab may be retained on extension 226. In an alternative embodiment, stitching 218 may not exist or may be configured such that it does not rupture. In this case, a different portion of tab 216 may be configured to rupture.

Figure 4:
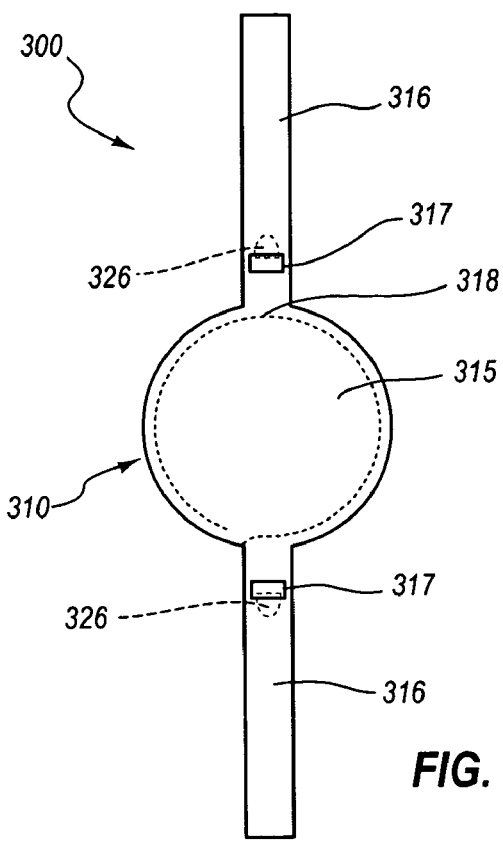
FIG. 4 is a side elevation view of an alternative embodiment of a portion of an airbag assembly.
Figure 5:
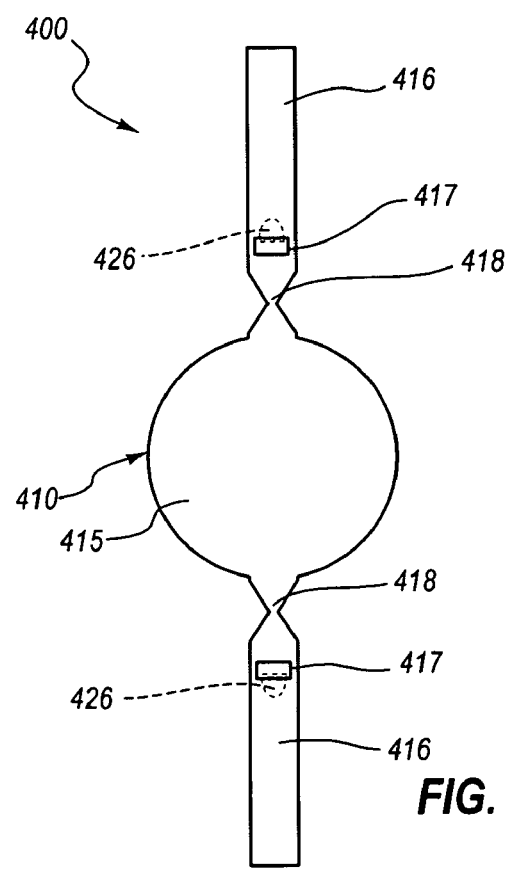
FIG. 5 is a side elevation view of an alternative embodiment of a portion of an airbag assembly.
Figure 6:
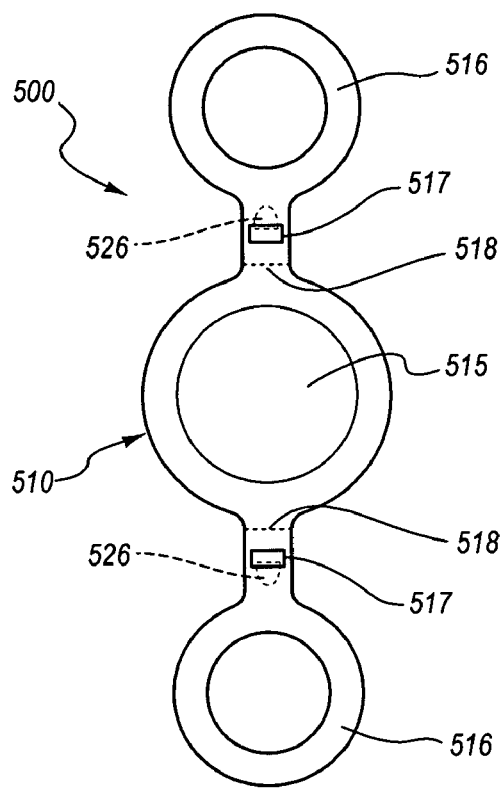
FIG. 6 is a side elevation view of an alternative embodiment of a portion of an airbag assembly.

FIGS. 4-6 depict alternative embodiments of portions of airbag assemblies 300, 400, and 500. The figures show cushion membrane structures that may function to allow the membrane vent apertures to be retained in an aligned configuration with housing apertures when the membrane is in a packaged configuration or when the cushion deploys but encounters an obstacle, such as an out-of-position occupant. Tabs 316, 416, and 516 may be configured similarly and may function similarly as tab 216, described herein. FIG. 4 depicts tab 316, wherein the tab comprises a slot 317 that is configured to receive a housing extension 326. Tab 316 may be coupled to cushion membrane 310 via tear stitching 318, wherein the stitching is configured to rupture upon airbag deployment without obstruction such that vent aperture 315 may become misaligned with a housing aperture as described herein.

FIG. 5 depicts a portion of airbag assembly 400, wherein 410 comprises a tab 416 that is configured to allow vent aperture 415 to be retained in alignment with a housing aperture when cushion membrane 410 is in a packaged configuration, or if the cushion deploys and encounters an obstruction, such as an out-of-position occupant. Tab 416 comprises a slot 417 that is configured to be received by a housing extension 426 and a tear point 418. Upon deployment wherein cushion 410 can nearly maximally expand, tear point 418 is configured to rupture, thereby allowing vent aperture 415 to become misaligned with a housing aperture. Tear point 418 may comprise a portion of tab 416 that has a reduced cross sectional area when viewed from a transverse or longitudinal cross section. In other words, the width and/or thickness of the tab may be reduced at the tear point. In another embodiment, the tear point may additionally be perforated.

FIG. 6 depicts a portion of assembly 500 that comprises a tab 516, which is configured to allow vent aperture 515 to be retained in alignment with a housing aperture when cushion membrane 510 is in a packaged configuration, or deploys with obstruction. Tab 516 comprises a ring with an extension that has a slot 317 that is configured to receive a housing extension 526. Tab 516 may be coupled to cushion membrane 510 via tear stitching 518, wherein the stitching is configured to rupture upon airbag deployment without obstruction such that vent aperture 515 may become misaligned with a housing aperture as described herein.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the disclosure is therefore defined by the following claims.

The invention claimed is:

1. An airbag assembly, comprising:
an airbag assembly housing having first housing aperture and a second housing aperture;
an inflatable airbag cushion disposed inside the airbag assembly housing;
wherein the inflatable airbag cushion comprises a cushion membrane having a first vent aperture and a second vent aperture, wherein the first vent aperture and the second vent aperture are located opposite each other in opposing sides of the airbag cushion, and
wherein the inflatable airbag cushion further comprises two tabs that are each respectively coupled near a perimeter of each vent aperture, each tab protruding through the housing aperture adjacent to the respective vent aperture, and each tab is coupled to a side wall of the housing,
wherein the first vent aperture is initially aligned with the first housing aperture and the second vent aperture is initially aligned with the second housing aperture such that during inflatable airbag cushion deployment with obstruction, the first vent aperture remains at least partially aligned with the first housing aperture and the second vent aperture remains at least partially aligned with the second housing aperture, thereby allowing inflation gas to exit the airbag cushion via vent and apertures, and
wherein during inflatable airbag cushion deployment without obstruction, the vent apertures move as the inflatable airbag cushion expands such that the vent apertures become misaligned with respect to the housing apertures, whereby inflation gas directed toward the housing apertures is blocked from exiting through the housing apertures by the cushion membrane and the inflatable airbag cushion fully expands.

2. The airbag assembly of claim 1, further comprising a diffuser configured to receive inflation gas from an inflator and to re-direct inflation gas from the inflator in the direction of the first housing aperture and the second housing aperture of the airbag assembly housing.

3. The airbag assembly of claim 2, wherein a portion of the diffuser is attached to the inflatable airbag cushion.

4. The airbag assembly of claim 1, wherein each tab is coupled to the inflatable airbag cushion via tear stitching, wherein the tear stitching is configured to rupture if the airbag cushion fully deploys without encountering an obstruction such that the first and second vent apertures may become misaligned respectively with the first and second housing apertures.

5. The airbag assembly of claim 1, wherein each tab comprises a slot that is configured to receive an extension that is coupled to the sidewall of the housing.

6. The airbag assembly of claim 5, wherein each tab further comprises at least one aperture in addition to the slot, wherein the additional aperture is configured to allow a worker to pull each tab through one of the housing apertures.

7. The airbag assembly of claim 1, wherein each tab comprises a tear point.

8. The airbag assembly of claim 7, wherein the tear point in each tab comprises perforations in the tab.

9. The airbag assembly of claim 7, wherein the tear point in each tab comprises a reduction in the cross sectional area of the tab.

10. An airbag assembly, comprising:
an airbag assembly housing having at least one aperture; and
an inflatable airbag cushion in a packaged configuration and located inside the airbag assembly housing, wherein the cushion comprises at least one vent aperture that is retained in at least partial alignment with the housing aperture via at least one tab,
wherein during inflatable airbag cushion deployment with obstruction, the at least one tab continues to retain the housing and vent apertures in at least partial alignment, thereby allowing inflation gas to exit the airbag cushion via the vent and housing apertures, and
wherein during inflatable airbag cushion deployment without obstruction, the at least one tab ceases to retain the vent and housing apertures in at least partial alignment such that the housing and vent apertures may become at least partially misaligned.

11. The airbag assembly of claim 10, wherein the tab is coupled to the inflatable airbag cushion near a perimeter of the at least one vent aperture, and wherein the tab protrudes through the at least one housing aperture and is coupled to a side wall of the housing.

12. The airbag assembly of claim 11, wherein the tab is coupled to the inflatable airbag cushion via tear stitching, wherein the tear stitching is configured to rupture if the airbag cushion fully deploys without encountering an obstruction such that the vent aperture may become misaligned with the housing aperture.

13. The airbag assembly of claim 11, wherein the tab comprises a slot that is configured to receive an extension that is coupled to the sidewall of the housing.

14. The airbag assembly of claim 13, wherein the tab further comprises at least one aperture in addition to the slot, wherein the additional aperture is configured to allow a worker to pull the tab through the aperture in the housing.

15. The airbag assembly of claim 10, wherein the tab comprises a tear point.

16. The airbag assembly of claim 15, wherein the tear point comprises perforations in the tab.

17. The airbag assembly of claim 15, wherein the tear point comprises a reduction in the cross sectional area of the tab.

18. The airbag assembly of claim 10, wherein the volume of inflation gas that is vented through the at least one vent aperture is reduced by the complete deployment of the inflatable airbag without obstruction, wherein during the complete deployment of the inflatable airbag the tension in the inflatable airbag cushion pulls the at least one vent aperture out of alignment with the at least one housing aperture.

19. An airbag assembly, comprising:
an airbag assembly housing comprising a first housing aperture and a second housing aperture;
an inflatable airbag cushion disposed within the airbag assembly housing;
wherein the inflatable airbag cushion comprises a cushion membrane having a first vent aperture and a second vent aperture, wherein the first vent aperture and the second vent aperture are located opposite each other in opposing sides of the inflatable airbag cushion, wherein when the cushion is in a packaged configuration, the first vent aperture is aligned with the first housing aperture and the second vent aperture is aligned with the second housing aperture; and a diffuser disposed within the inflatable airbag cushion and configured to receive inflation gas from an inflator and to re-direct inflation gas from the inflator in the direction of the first housing aperture and the second housing aperture of the airbag assembly housing such that the gas exits the inflatable airbag cushion via the at least one vent aperture when deployment of the airbag is obstructed;

wherein, during initial deployment of the inflatable airbag cushion, the first vent aperture is aligned with the first housing aperture and the second vent aperture is aligned with the second housing aperture, and during deployment of the inflatable airbag cushion with obstruction, the first vent aperture remains at least partially aligned with the first housing aperture and the second vent aperture remains at least partially aligned with the second housing aperture, thereby allowing inflation gas to be directed from the diffuser toward the housing apertures and exit out of the housing apertures via the vent apertures; and wherein during inflatable airbag cushion deployment without obstruction, the vent apertures move as the inflatable airbag cushion expands such that the vent apertures become at least partially misaligned with respect to the housing apertures and the diffuser, whereby inflation gas directed from the diffuser toward the housing apertures is blocked from exiting through the housing apertures by the cushion membrane and the inflatable airbag cushion fully expands.

20. The airbag assembly of claim 19, wherein the inflatable airbag cushion further comprises two tabs that are each respectively coupled to the cushion membrane, extend through one of the housing apertures, and are each coupled to the housing such that each of the vent apertures cannot be moved relative to the adjacent housing aperture upon initial deployment of the inflatable airbag cushion.

21. The airbag assembly of claim 20, wherein each tab is coupled to the inflatable airbag cushion via tear stitching, wherein the tear stitching is configured to rupture if the airbag cushion fully deploys without encountering an obstruction such that the first and second vent apertures may become misaligned respectively with the first and second housing apertures.

22. The airbag assembly of claim 20, wherein each tab comprises a slot that is configured to receive an extension that is coupled to the sidewall of the housing.

23. The airbag assembly of claim 20, wherein each tab comprises a tear point.

24. The airbag assembly of claim 23, wherein the tear point in each tab comprises perforations in the tab.

25. The airbag assembly of claim 24, wherein the tear point in each tab comprises a reduction in the cross sectional area of the tab.

26. The airbag assembly of claim 19, wherein a portion of the diffuser is attached to the inflatable airbag cushion.

27. The airbag assembly of claim 19, wherein the first and second vent apertures are not attached respectively with the first and second housing apertures.

* * * * *